United States Patent
Kuo et al.

(10) Patent No.: US 9,720,215 B2
(45) Date of Patent: Aug. 1, 2017

(54) ZOOM LENS

(71) Applicant: Coretronic Corporation, Hsin-Chu (TW)

(72) Inventors: Tao-Hung Kuo, Hsin-Chu (TW); Ching-Chuan Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/953,038

(22) Filed: Nov. 27, 2015

(65) Prior Publication Data
US 2017/0153429 A1 Jun. 1, 2017

(51) Int. Cl.
G02B 15/177 (2006.01)
G02B 15/16 (2006.01)
G02B 13/16 (2006.01)

(52) U.S. Cl.
CPC ........... *G02B 15/177* (2013.01); *G02B 13/16* (2013.01); *G02B 15/16* (2013.01)

(58) Field of Classification Search
CPC ...... G02B 15/177; G02B 15/16; G02B 15/20; G02B 13/009; G02B 13/16
USPC .......................................... 359/676, 683–685
See application file for complete search history.

(56) References Cited

U.S. PATENT DOCUMENTS

| 6,738,196 | B2 | 5/2004 | Yamamoto |
| 7,715,111 | B2 | 5/2010 | Yamamoto et al. |
| 8,072,690 | B2 | 12/2011 | Nagatoshi |
| 8,179,607 | B2 | 5/2012 | Amano |
| 8,699,152 | B2 | 4/2014 | Amano |
| 2004/0125462 | A1* | 7/2004 | Misaka ................ G02B 15/177 359/684 |
| 2008/0247049 | A1* | 10/2008 | Inoko .................. G02B 15/177 359/649 |
| 2008/0316616 | A1* | 12/2008 | Kawana ................ G02B 13/22 359/683 |
| 2009/0180199 | A1* | 7/2009 | Endo .................... G02B 15/177 359/686 |

FOREIGN PATENT DOCUMENTS

| CN | 201662648 | 12/2010 |
| CN | 201681200 | 12/2010 |
| CN | 103454756 | 12/2013 |
| CN | 103048777 | 4/2015 |
| JP | 2005283709 | 10/2005 |

(Continued)

OTHER PUBLICATIONS

"Office Action of Japan Counterpart Application", issued on Nov. 8, 2016, p. 1-p. 13.

*Primary Examiner* — Jordan Schwartz
(74) *Attorney, Agent, or Firm* — Jianq Chyun IP Office (57) ABSTRACT

A zoom lens including first to seventh lens units arranged in this order from an object side to an image side is provided. The first to seventh lens units respectively have refractive powers of negative, positive, negative, positive, positive, negative. The first to seventh lens units are disposed along an optical axis of the zoom lens, and a distance between the seventh lens and the image side is fixed, and the first lens unit, the second lens unit, the third lens unit, the fourth lens unit, the fifth lens unit and the sixth lens unit are adapted to move along the optical axis between the object side and the image side.

17 Claims, 9 Drawing Sheets

(56) References Cited

FOREIGN PATENT DOCUMENTS

| JP | 2006126741 | 5/2006 |
|----|------------|--------|
| JP | 2007047538 | 2/2007 |
| JP | 2012212106 | 11/2012 |
| TW | 556000 | 10/2003 |
| TW | I479223 | 4/2015 |

* cited by examiner

ZOOM LENS

BACKGROUND OF THE INVENTION

1. Field of the Invention

The invention generally relates to an optical device, in particular, to a zoom lens.

2. Description of Related Art

It is necessary for a projection apparatus to have a high luminance, high resolution and high zoom ratio. Known projection apparatus are generally configured to use a light valve such as liquid crystal display or digital micro-mirror device so as to project an image on the basis of the light valve on a screen surface through a zoom lens in an enlarged scale. Therefore, the projector is desired to project a large and bright projection image with high resolution in order to ensure appropriate visibility when the image is projected in an enlarged scale, and the scale of the projection image is depended on the zoom ratio of the zoom lens.

In order to provided an enlarged image with high luminance, known zoom lens of a projector apparatus may include multiple lens units of the zoom lens or arrange large quantity of lenses near the magnification side of the zoom lens. During a zooming process, a distance between lens groups of the zoom lens is adjusted and a distance between an image source and plurality of lens groups is increased. Therefore, the distribution of weight of the lenses is concentrate on the front part of the zoom lens during zooming. Tilting of the zoom lens might happen, and especially the zoom lens is adjusted to the telephoto end wherein the tilting is one of the main causes of dislocation of the enlarged image.

The information disclosed in Description of Related Art is only for enhancement of understanding of the background of the described technology and therefore it may contain information that does not form the prior art that is already known to a person of ordinary skill in the art. Further, the information disclosed in Description of Related Art does not mean that one or more problems to be resolved by one or more embodiments of the invention was acknowledged by a person of ordinary skill in the art.

SUMMARY OF THE INVENTION

The invention is directed to a zoom lens being adapt to project an image with high brightness and high zoom ratio, and made easily at lower cost.

The other purpose and advantages of the invention may be further understood from the technical features of the disclosures of the invention.

For achieving the foregoing at least one of the purpose or the other purpose, in one embodiment of the invention, a zoom lens includes first to seventh lens units respectively having refractive powers of negative, positive, negative, positive, positive, negative, and positive and arranged in this order from an object side to an image side. The first to seventh lens units are disposed along an optical axis of the zoom lens. A distance between the seventh lens and the image side is fixed. The first lens unit, the second lens unit, the third lens unit, the fourth lens unit, the fifth lens unit and the sixth lens unit are adapted to move along the optical axis between the object side and the image side.

In one embodiment of the invention, the first lens unit includes a first lens having a negative refractive power. The second lens unit includes a second lens having a positive refractive power and a third lens having a positive refractive power arranged in order from the object side to the image side. The third lens unit includes a fourth lens having a negative refractive power, a fifth lens having a negative refractive power and a sixth lens having a negative refractive power arranged in order from the object side to the image side. The fourth lens unit includes a seventh lens having a negative refractive power and an eighth lens having a positive refractive power arranged in order from the object side to the image side. The fifth lens unit includes a ninth lens having a positive refractive power, an aperture, a tenth lens having a positive refractive power and an eleventh lens having a negative refractive power arranged in order from the object side to the image side. The sixth lens unit includes a twelfth lens having a negative refractive power, a thirteenth lens having a positive refractive power, a fourteenth lens having a negative refractive power, a fifteenth lens having a positive refractive power and a sixteenth lens having a positive refractive power in order from the object side to the image side. The seventh lens unit includes a seventeenth lens having a positive refractive power.

In one embodiment of the invention, the first lens is a meniscus lens having a protruding surface facing the object side.

In one embodiment of the invention, the second lens is a biconvex lens, and the third lens is a meniscus lens having a protruding surface facing the object side.

In one embodiment of the invention, the fourth lens is a meniscus lens having a protruding surface facing the object side, and the fifth lens and the sixth lens are biconcave lenses.

In one embodiment of the invention, the seventh lens is a biconcave lens, and the eighth lens is a biconvex lens.

In one embodiment of the invention, the ninth lens is a plano-convex lens having a protruding surface facing the object side, and the tenth lens is a biconvex lens, and the eleventh lens is a negative meniscus lens having a protruding surface facing the image side, and the tenth lens and the eleventh lens form a cemented doublet lens.

In one embodiment of the invention, the twelfth lens and the fourteenth lens are biconcave lenses, and the thirteenth lens, the fifteenth lens and the sixteenth lens are biconvex lenses, and the twelfth lens and the thirteenth lens form a cemented doublet lens.

In one embodiment of the invention, the seventeenth lens is a meniscus lens having a protruding surface facing the object side.

In one embodiment of the invention, the first to the seventeenth lens are spherical lens.

In one embodiment of the invention, $D_{object}$ is a distance along the optical axis between the object side and the first lens unit, and $D_2$ is a distance along the optical axis between the first lens unit and the second lens unit, and the following condition formula is satisfied: $49.38 \leq D_{object}/D_2 \leq 3813.38$.

In one embodiment of the invention, $H_{object}$ is an image height of the zoom lens at the object side, LLw is a total length of the zoom lens at a wide angle end, and following condition formula is satisfied: $3.62 \leq H_{object}/LLw \leq 47.01$, and LLt is a total length of the zoom lens at a telephoto end, and following condition formula is satisfied: $1.76 \leq H_{object}/LLt \leq 22.99$.

In one embodiment of the invention, $D_{L2}$ is a distance along the optical axis between the image side and the second lens unit, and $D_{L5}$ is a distance along the optical axis between the image side and the fifth lens unit, and $D_{L6}$ is a distance along the optical axis between the image side and the sixth lens unit, and each of $D_{L2}$, $D_{L5}$ and $D_{L6}$ increases while an image height of the zoom lens is decreasing.

In one embodiment of the invention, $D_2$ is a distance along the optical axis between the first lens unit and the second lens unit, and $D_2$ is fixed while the image height of the zoom lens changes.

In one embodiment of the invention, $D_{L3}$ is a distance along the optical axis between the image side and the third lens unit, and $D_{L4}$ is a distance along the optical axis between the image side and the fourth lens unit, and each of $D_{L3}$ and $D_{L4}$ decreases and then increases during a decrease of an image height of the zoom lens.

In one embodiment of the invention, $h_3$ is an image height of the zoom lens while the third lens unit is at a turning position during the decrease of the image height of the zoom lens, and $h_4$ is an image height of the zoom lens while the fourth lens unit is at a turning position during the decrease of the image height of the zoom lens, and following condition formula is satisfied: $h_4 > h_3$.

In one embodiment of the invention, $f_1$ is a focal length of the first lens unit, and $f_w$ is a focal length of the zoom lens at an wide angle end, and following condition formula is satisfied:

$$-13 < \frac{f_1}{f_w} < -5.$$

In one embodiment of the invention, $f_2$ is a focal length of the second lens unit, and $f_w$ is a focal length of the zoom lens at an wide angle end, and following condition formula is satisfied:

$$1 < \frac{f_2}{f_w} < 7.$$

Based on the foregoing description, the embodiments of the invention have at least one of the advantages below. In the embodiments of the invention, the zoom lens is formed by seven lens units, and the mass of the zoom lens is evenly distributed at the time the zooming provided. Moreover, the zoom lens has high F number, zoom ratio, and projection apparatus using the zoom lens can also provide an enlarged image with high resolution. A little variation in weight balance of the zoom lens makes the projection apparatus stable during zooming.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

In the following detailed description of the embodiments, reference is made to the accompanying drawings which form a part hereof, and in which are shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A"

component is directly "adjacent to" "B" component or one or more additional components are between "A" component and "B" component. Accordingly, the drawings and descriptions will be regarded as illustrative in nature and not as restrictive.

In an embodiment of the invention, a zoom lens can project a light coming from an light valve upon a surface, so as to display an image with high resolution, brightness in multiple dimensions on the surface. In other words, the zoom lens of the embodiment is a proper projection lens.

Figure 1A:
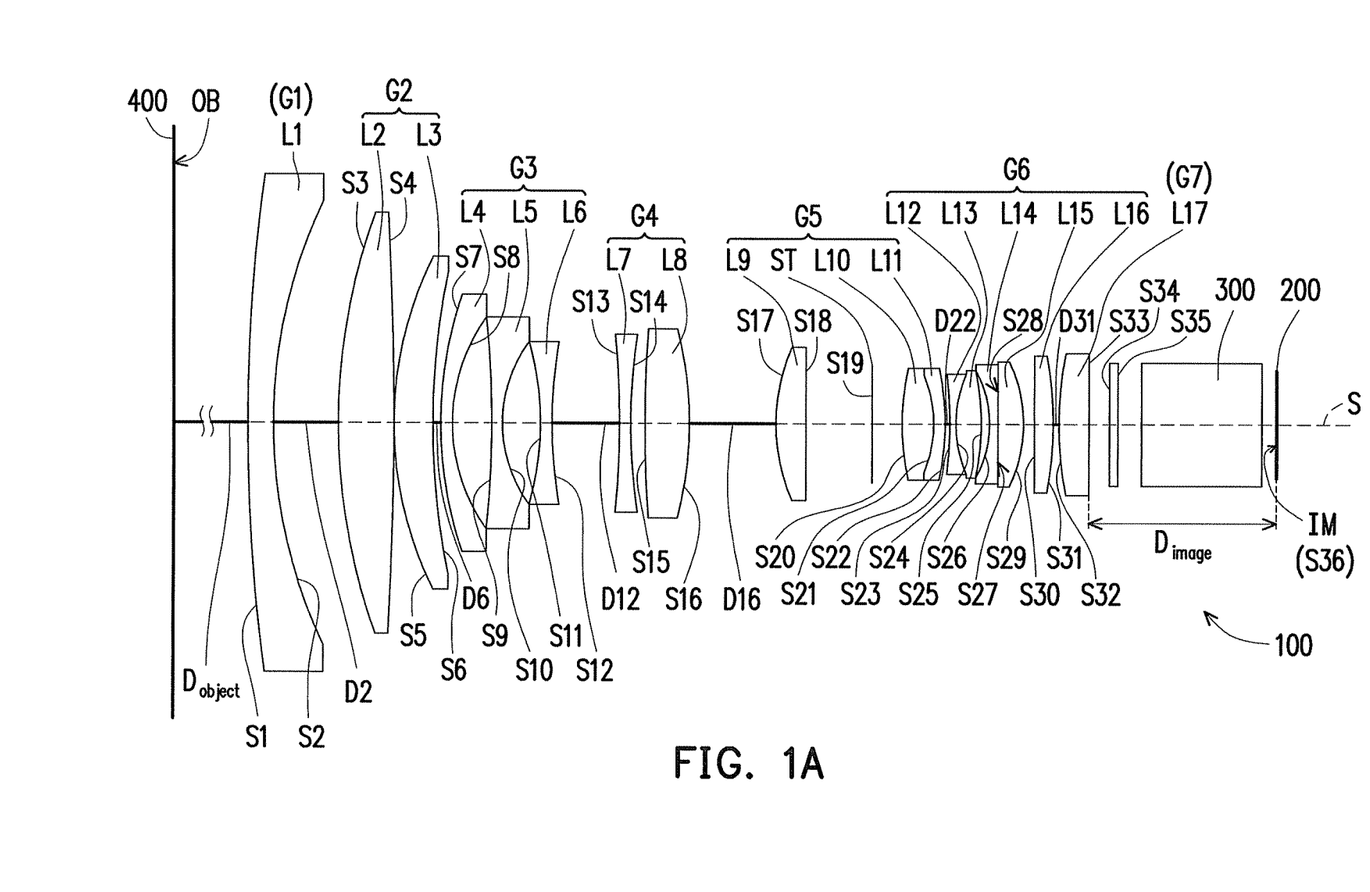
FIGS. 1A and 1B illustrate cross-sectional views of a zoom lens at a wide angle end and a telephoto end, respectively, according to an embodiment of the invention.

Referring to FIG. 1A, the zoom lens 100 of the embodiment includes a first lens unit G1 having a negative refractive power, a second lens unit G2 having a positive refractive power, a third lens unit G3 having a negative refractive power, a fourth lens unit G4 having a positive refractive power, a fifth lens unit G5 having a positive refractive power, a sixth lens unit G6 having a negative refractive power, and a seventh lens unit G7 having a positive refractive power. The first lens unit G1, the second lens unit G2, the third lens unit G3, the fourth lens unit G4, the fifth lens unit G5, the sixth lens unit G6, and the seventh lens unit G7 are disposed on an optical axis S of the zoom lens 100 and arranged in order from an object side OB to an image side IM. A distance $D_{image}$ between the seventh lens unit G7 and the image side IM is fixed at the time of zooming or focusing, and the first to the sixth lens unit G1~G6 are adapted to move along the optical axis S between the object side OB and the image side IM at the time of zooming or focusing.

Therefore, the zoom lens 100 having the movable first to sixth lens units G1~G6 and the fixed seventh lens unit G7 has a proper weight distribution. To be more specific, a centre of weight of the zoom lens 100 of the embodiment is closer to the image side IM than the object side OB at the time of zooming or focusing, and therefore the zoom lens can be properly attached to a projection apparatus.

Figure 1B:
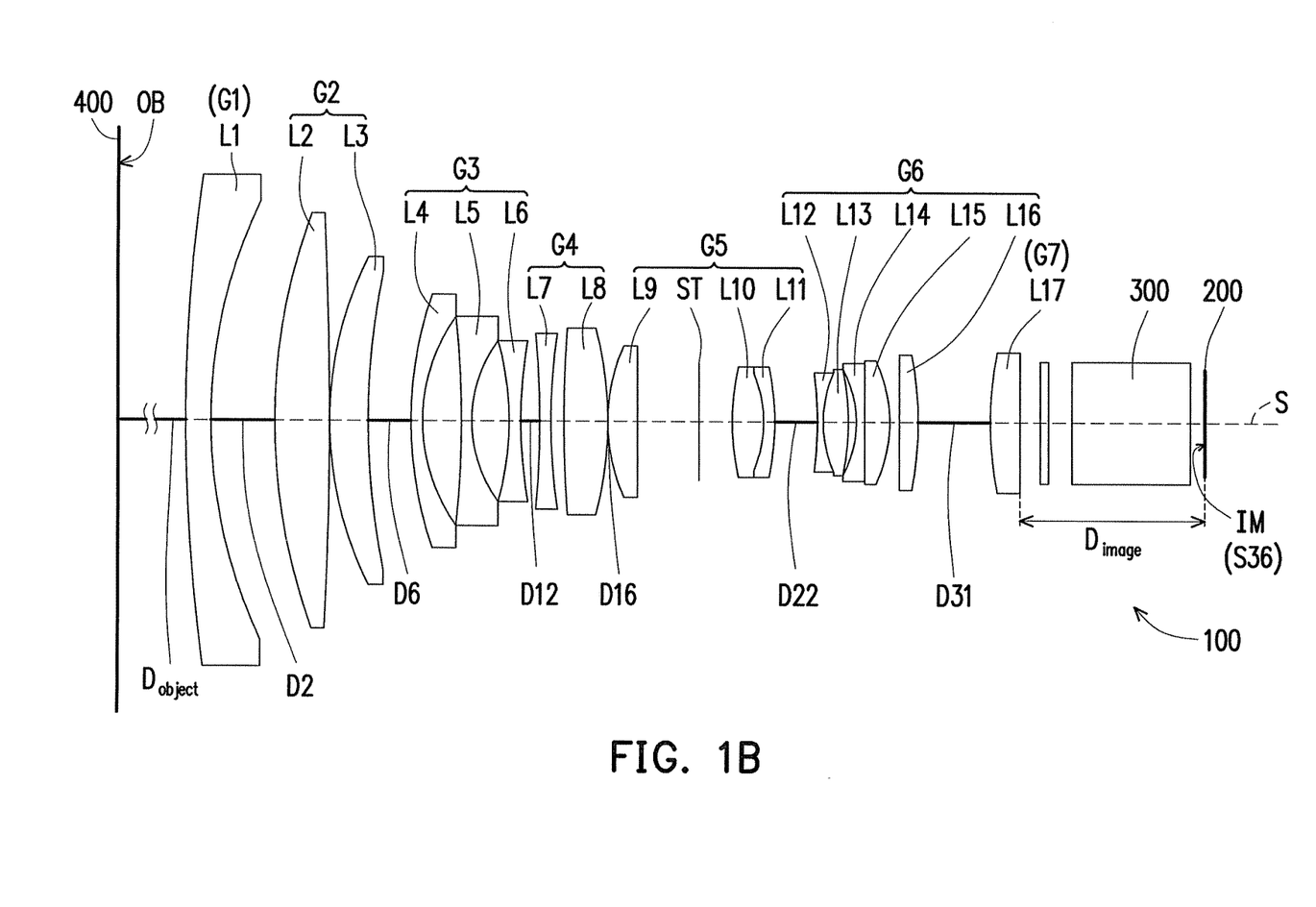

Referring to FIGS. 1A and 1B, the zoom lens 100 of the embodiment satisfies the following condition formulas (1) and (2):

$$3.62 \leq H_{object}/LLw \leq 47.01 \quad (1),$$

$$1.76 \leq H_{object}/LLt \leq 22.99 \quad (2).$$

In the condition formulas (1) and (2), $H_{object}$ is an image height of the zoom lens 100 at the object side OB, LLw is a total length of the zoom lens 100 at a wide angle end, LLt is a total length of the zoom lens 100 at a telephoto end. Therefore, the zoom lens 100 can be prevented from tilting at the time of zooming and provide high zoom ratio in a projection apparatus.

In detail, the image side IM of the embodiment is, for example, an light valve 200 having an image display surface facing the zoom lens 100. The light valve 200 includes, but not limited to, digital micro-mirror devices (DMD), micro-electromechanical systems (MEMS), grating light valve devices (GLV), liquid crystal display devices (LCD), liquid crystal on silicon devices (LCOS), etc. The distance $D_{image}$ is a distance between a surface of a lens of the seventh lens unit G7 closest to the image side IM and the image display surface of light valve 200. Furthermore, a prism 300 is disposed between the zoom lens 100 and the light valve 200 for combines color images for generating multi color image. The prism 300 includes, but not limited to, a TIR prism (Total internal reflection prism), etc.

Also, the object side OB of the embodiment is, for example a screen 400 having a surface facing the zoom lens 100, and distance $D_{object}$ is the distance between a surface of a lens of the first lens unit G1 closest to the object side OB and the surface of the screen 400, on which the image is projected.

The zoom lens 100 of the embodiment includes seventeen lenses being disposed along the optical axis S, and each of the seventeen lenses is spherical lens. Therefore, the cost of manufacturing the zoom lens 100 can be reduced. Moreover, the lenses of the zoom lens 100 of the embodiment are made of glass. Therefore, the manufacture process of the zoom lens 100 needs no molding, and the cost of the manufacturing the zoom lens 100 can be further reduced.

Referring to FIGS. 1A and 1B, the first lens unit G1 includes a first lens L1 having a negative refractive power, and the first lens L1 is a meniscus lens having a protruding surface S1 facing the object side OB, and an interval between the object side OB and the protruding surface S1 of the first lens L1 is the distance $D_{object}$. Since the first lens unit G1 has only one lens, the total weight of the first lens unit G1 is reduced, and during zooming, there is little variation in weight balance of the zoom lens 100.

Moreover, the zoom lens 100 satisfies the following condition formula (3):

$$-13 < \frac{f_1}{f_w} < -5. \quad (3)$$

In the above condition formula (3), $f_1$ is a focal length of the first lens unit G1, and $f_w$ is a focal length of the zoom lens 100 at the wide angle end. Therefore, optical aberration of the zoom lens 100 of the embodiment is properly controlled. If, for example, $$\frac{f_1}{f_w}$$

exceeds the upper limit (−5), then astigmatism and chromatic aberration of the zoom lens would become large. If, for example, $$\frac{f_1}{f_w}$$

is less than the lower limit (−13), then field curvature and chromatic aberration of the zoom lens would become large.

The second lens unit G2 of the embodiment includes a second lens L2 having a positive refractive power and a third lens L3 having a positive refractive power arranged in order from the object side OB to the image side IM. The second lens L2 is a biconvex lens, and the third lens L3 is a meniscus lens having a protruding surface S5 facing the object side OB.

In more detail, the third lens L3 moves along with the second lens L2, and a distance D2 between the first lens unit G1 and the second lens unit G2 varies at the time of focusing. In other word, a position where the clear image is projected on the screen 400 by the zoom lens 100 is able to be correspondingly controlled by varying the distance D2. In this embodiment, the zoom lens 100 satisfies the following condition formula (4):

$$49.38 \leq D_{object}/D_2 \leq 3813.38 \quad (4).$$

In the above condition formula (4), $D_{object}$ is the distance along the optical axis between the object side OB and the first lens unit G1, and $D_2$ is the distance along the optical axis between the first lens unit G1 and the second lens unit G2. Therefore, $D_2$ of the embodiment remains fixed at the time of zooming, but varying at the time of focusing. In this embodiment, the distance D2 is ranged between 3.59 mm and 27.33 mm during focusing.

Moreover, the zoom lens 100 satisfies the following condition formula (5):

$$1 < \frac{f_2}{f_w} < 7. \qquad (5)$$

In the above condition formula (5), $f_2$ is a focal length of the second lens unit G2. Therefore, optical aberration of the zoom lens 100 of the embodiment is properly controlled. If, for example, $$\frac{f_2}{f_w}$$

exceeds the upper limit (7), then spherical aberration, distortion, lateral color aberration and transverse color aberration of the zoom lens would become large. If, for example, $$\frac{f_2}{f_w}$$

is less than the lower limit (1), then astigmatism, field curvature, lateral color aberration and transverse color aberration of the zoom lens would become large.

Figure 2A:
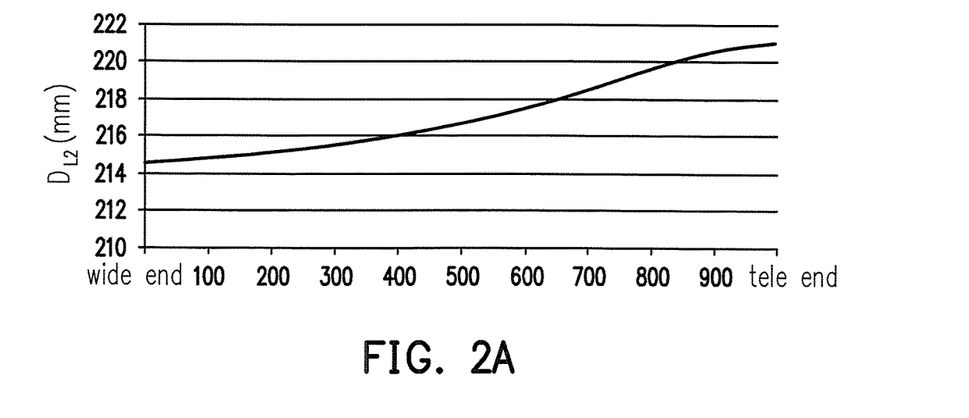
FIG. 2A is a diagram illustrating variation of the distance between the second lens unit and the image side of the zoom lens when zooming between the wide angle end and the telephoto end of the embodiment of the invention.

FIG. 2A is a diagram illustrating variation of the distance between the second lens unit and the image side of the zoom lens when zooming between the wide angle end and the telephoto end of the embodiment of the invention. Referring to FIG. 2A, the distance $D_{L2}$ between the second lens unit G2 and the image side IM continuously increases at the process of zooming from the wide angle end to the telephoto end. In other words, the distance $D_{L2}$ along the optical axis S between the image side IM and the second lens unit G2, increases during the decrease of the height of the image projected from the zoom lens 100.

The third lens unit G3 of the embodiment includes a fourth lens L4 having a negative refractive power, a fifth lens L5 having a negative refractive power and a sixth lens L6 having a negative refractive power arranged in order from the object side OB to the image side IM. The fourth lens L4 is a meniscus lens having a protruding surface S7 facing the object side OB, and the fifth lens L5 and the sixth lens L6 are biconcave lenses.

Figure 2B:
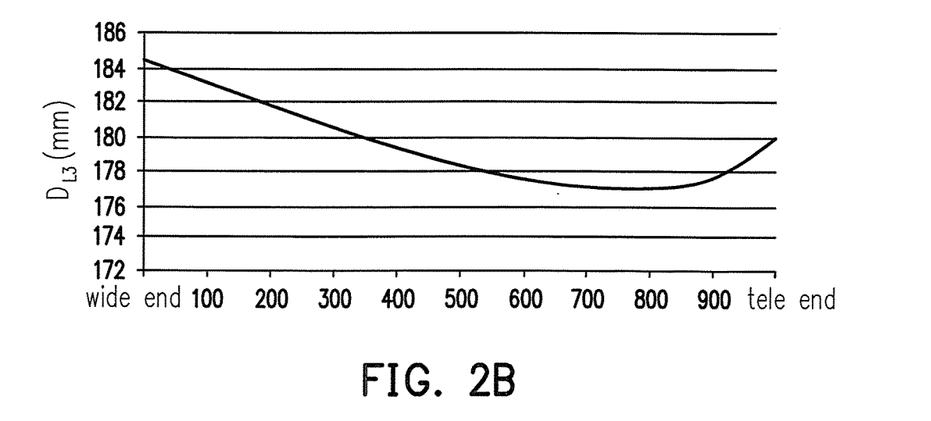
FIG. 2B is a diagram illustrating variation of the distance between the third lens unit and the image side of the zoom lens when zooming between the wide angle end and the telephoto end of the embodiment of the invention.

While the zoom lens 100 of the embodiment is zooming from the wide angle end to the telephoto end, the minimum distance between the third lens unit G3 and the image side IM appears in the middle of the zooming process. FIG. 2B is a diagram illustrating variation of the distance between the third lens unit and the image side of the zoom lens when zooming between the wide angle end and the telephoto end of the embodiment of the invention. Referring to FIG. 2B, a distance DL3 along the optical axis S between the image side IM and the third lens unit G3 decreases and then increase during the decrease of the image height of the zoom lens 100. A turning point is shown in the diagram when the third lens unit G3 moves along the optical axis S. For more details, when zooming from the wide angle end to the telephoto end, firstly, the third lens unit G3 moves in a direction from the object side OB to the image side IM. The direction of the movement is changed at the turning point. And then the third lens unit G3 moves from the image side IM to the object side. In other words, the third lens unit G3 moves in a locus direction that turns back in reverse direction at its a turning point during the decrease of the image height of the zoom lens 100.

The fourth lens unit G4 of the embodiment includes a seventh lens L7 having a negative refractive power and an eighth lens L8 having a positive refractive power arranged in order from the object side OB to the image side IM, and the seventh lens L7 is a biconcave lens, and the eighth lens L8 is a biconvex lens.

Figure 2C:
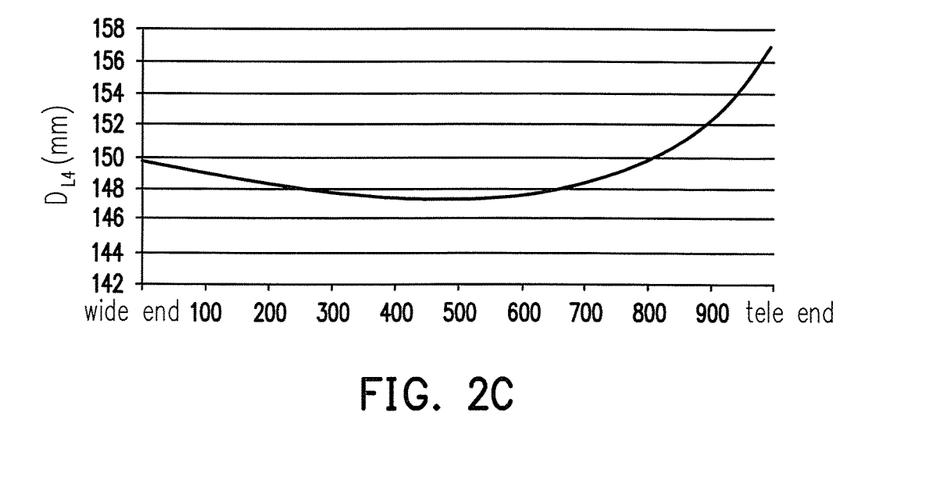
FIG. 2C is a diagram illustrating variation of the distance between the fourth lens unit and the image side of the zoom lens when zooming between the wide angle end and the telephoto end of the embodiment of the invention.

FIG. 2C is a diagram illustrating variation of the distance between the fourth lens unit and the image side of the zoom lens when zooming between the wide angle end and the telephoto end of the embodiment of the invention. Referring to FIG. 2C, a distance DL4 along the optical axis S between the image side IM and the fourth lens unit G4 decreases and then increases during the decrease of the image height of the zoom lens 100. While the zoom lens 100 zooms from the wide angle end to the telephoto end, the minimum distance between the fourth lens unit G4 and the image side IM appears in the middle of the zooming process. A turning point is shown in the diagram when the fourth lens unit G4 moves along the optical axis S. For more details, when zooming from the wide angle end to the telephoto end, firstly, the fourth lens unit G4 moves in a direction from the object side OB to the image side IM. The direction of the movement is changed at the turning point. And then the fourth lens unit G4 moves from the image side IM to the object side. In other words, the movement of the fourth lens G4 moves in a locus direction that turns back in reverse direction at its turning point during the decrease of the image height of the zoom lens 100.

Moreover, the zoom lens 100 of the embodiment satisfies the following condition formula (7):

$$h_4 > h_3 \qquad (7).$$

In the above condition formula (7), h3 is image height of the zoom lens 100 while the third lens unit G3 is at its turning point during the decrease of the image height of the zoom lens 100, and $h_4$ is image height of the zoom lens 100 while the fourth lens unit G4 is at its turning point during the decrease of the image height of the zoom lens 100. The process of decrease of the image height of the zoom lens 100 is also the process of the zoom lens 100 is zooming from the wide angle end toward the telephoto end, and, referring to FIG. 2B and FIG. 2C, during zooming from the wide angle end to the telephoto end, the fourth lens unit G4 moves to reach its turning point earlier than the third lens unit G3.

The fifth lens unit G5 of the embodiment of the invention includes a ninth lens L9 having a positive refractive power, an aperture ST, a tenth lens L10 having a positive refractive power and an eleventh lens L11 having a negative refractive power arranged in order from the object side OB to the image side IM. To be more specific, the ninth lens L9 is a plano-convex lens having a protruding surface S17 facing the object side OB, and the tenth lens L10 is a biconvex lens, and the eleventh lens L11 is a negative meniscus lens having a protruding surface S22 facing the image side IM, and the tenth lens L10 and the eleventh lens L11 form a cemented doublet lens.

In other words, the aperture ST of the zoom lens 100 of the embodiment moves along with the ninth lens L9, the tenth lens L10 and the eleventh lens L11 of the fifth lens unit G5. A distance $D_{L5}$ along the optical axis S between the fifth lens unit G5 and the image side IM increases during zooming from the wide angle side to the telephoto side. In other words, the distance $D_{L5}$ of the zoom lens 100 increases during the decrease of the image height of the zoom lens 100.

The sixth lens unit G6 of the embodiment includes a twelfth lens L12 having a negative refractive power, a thirteenth lens L13 having a positive refractive power, a fourteenth lens L14 having a negative refractive power, a fifteenth lens L15 having a positive refractive power and a sixteenth lens L16 having a positive refractive power in order from the object side OB to the image side IM. To be more specific, the twelfth lens L12 and the fourteenth lens L14 are biconcave lenses. The thirteenth lens L13, the fifteenth lens L15 and the sixteenth lens L16 are biconvex lenses. The twelfth lens L12 and the thirteenth lens L13 form a cemented doublet lens. Also, a distance $D_{L6}$ along the optical axis S between the image side IM and the sixth lens unit G6 increases during the decrease of the image height of the zoom lens 100.

The seventh lens unit G7 of the embodiment includes a seventeenth lens L17 having a positive refractive power. To be more specific, the seventeenth lens L17 is a meniscus lens having a protruding surface S32 facing the object side OB.

The following content provides an embodiment of the zoom lens 100. However, the invention is not limited to the quantitative data listed in the following table. It should be known to those ordinary skilled in the art that various modifications and variations can be made to the invention without departing from the scope or spirit of the invention.

TABLE 1

| Element | Surface | Radius of Curvature (mm) | Interval (mm) | Refractive Index | Abbe Number |
| --- | --- | --- | --- | --- | --- |
| First Lens L1 | S1 | 612.48 | 6 | 1.805 | 25.43 |
|  | S2 | 120.2 | D2 |  |  |
| Second Lens L2 | S3 | 115.96 | 13.26 | 1.772 | 49.6 |
|  | S4 | −1110 | 0.1 |  |  |
| Third Lens L3 | S5 | 72.09 | 10.68 | 1.772 | 49.6 |
|  | S6 | 181 | D6 |  |  |
| Fourth Lens L4 | S7 | 63.11 | 3.4 | 1.694 | 53.21 |
|  | S8 | 34.18 | 10.45 |  |  |
| Fifth Lens L5 | S9 | −325.38 | 2.8 | 1.516 | 64.14 |
|  | S10 | 26.71 | 10.68 |  |  |
| Sixth Lens L6 | S11 | −60.99 | 2.2 | 1.487 | 70.24 |
|  | S12 | 74.78 | D12 |  |  |
| Seventh Lens L7 | S13 | −104.71 | 2 | 1.439 | 94.95 |
|  | S14 | 105.75 | 5.68 |  |  |
| Eighth Lens L8 | S15 | 215.93 | 8.88 | 1.805 | 25.43 |
|  | S16 | −73.13 | D16 |  |  |
| Ninth Lens L9 | S17 | 36.38 | 6.94 | 1.487 | 70.24 |
|  | S18 | −1529.08 | 18.86 |  |  |
| Aperture Stop ST | S19 | ∞ | 7.43 | — | — |
| Tenth Lens L10 | S20 | 56.11 | 7.36 | 1.487 | 70.24 |
| Eleventh Lens L11 | S21 | −26.79 | 4.75 | 1.801 | 34.97 |
|  | S22 | −55.73 | D22 |  |  |
| Twelfth Lens L12 | S23 | −57.93 | 1.79 | 1.847 | 23.78 |
| Thirteenth Lens L13 | S24 | 28.15 | 6.19 | 1.516 | 64.14 |
|  | S25 | −57.35 | 2.16 |  |  |
| Fourteenth Lens L14 | S26 | −22.78 | 1.55 | 1.648 | 33.79 |
|  | S27 | 925.27 | 0.11 |  |  |
| Fifteenth Lens L15 | S28 | 171.91 | 6.9 | 1.439 | 94.95 |
|  | S29 | −27.56 | 3.02 |  |  |
| Sixteenth Lens L16 | S30 | 570.93 | 4.86 | 1.805 | 25.43 |
|  | S31 | −56.73 | D31 |  |  |
| Seventeenth Lens L17 | S32 | 57.44 | 8.05 | 1.805 | 25.43 |

TABLE 1-continued

| Element | Surface | Radius of Curvature (mm) | Interval (mm) | Refractive Index | Abbe Number |
| --- | --- | --- | --- | --- | --- |
|  | S33 | 328.13 | 5.29 |  |  |
| Cover Glass | S34 | ∞ |  |  |  |
|  | S35 | ∞ | air |  |  |
| Light Valve 200 | S36 | ∞ |  | — | — |

Referring to FIGS. 1A-1B and Table 1, Table 1 lists surfaces of the first lens L1 to the seventeenth lens L17 of the zoom lens 100. Specifically, the surface S1 is a surface of the first lens L1 facing the object side OB, the surface S2 is a surface of the first lens L1 facing the image side OB, the surface S19 is a plane where the aperture stop ST is located, the surface S36 is the image display surface of the light valve 200 facing the object side OB, and the rest may be deduced by analogy. Further, "Interval" as listed in Table 1 refers to a straight line distance between two adjacent surfaces on the optical axis S. Specifically, an interval corresponding to the surface S1 in the table refers to a straight line distance between the surface S1 and the surface S2 on the optical axis S, an interval corresponding to the surface S2 in the table refers to a straight line distance between the surface S2 to the surface S3 on the optical axis S, and the rest may be deduced by analogy. The distances D2, D6, D12, D16, D22 and D31 are respectively the distance between the first lens unit G1 and the second lens unit G2, the distance between the second lens unit G2 and the third lens unit G3, the distance between the third lens unit G3 and the fourth lens unit G4, the distance between the fourth lens unit G4 and the fifth lens unit G5, the distance between the fifth lens unit G5 and the sixth lens unit G6, and the distance between the sixth lens unit G6 and the seventh lens unit G7. And D2, D6, D12, D16, D22 and D31 are variable. In addition, "Radius of Curvature" as listed in Table 1 being infinity (∞) refers to that the corresponding surface is a plane.

Moreover, while the zoom lens 100 is at the wide angle end, the distances D6, D12, D16, D22, D31 are about 1 mm, 16.38 mm, 23.84 mm, 1.17 mm, and 1 mm respectively, and, while the zoom lens 100 is at the telephoto end, the distances D6, D12, D16, D22, D31 are about 13.05 mm, 4.37 mm, 2.55 mm, 12.57 mm, and 18.41 mm respectively.

In more detail, the distances D6, D12, D16, D22, D31 are about 13.33 mm, 10.13 mm, 7.58 mm, 5.57 mm, and 10.79 mm respectively while the third lens unit G3 is on the turning position. The distances D6, D12, D16, D22, D31 about are 9.02 mm, 13.78 mm, 13.47 mm, 2.91 mm, and 5.64 mm respectively while the fourth lens unit G4 is on the turning position.

Figure 3A:
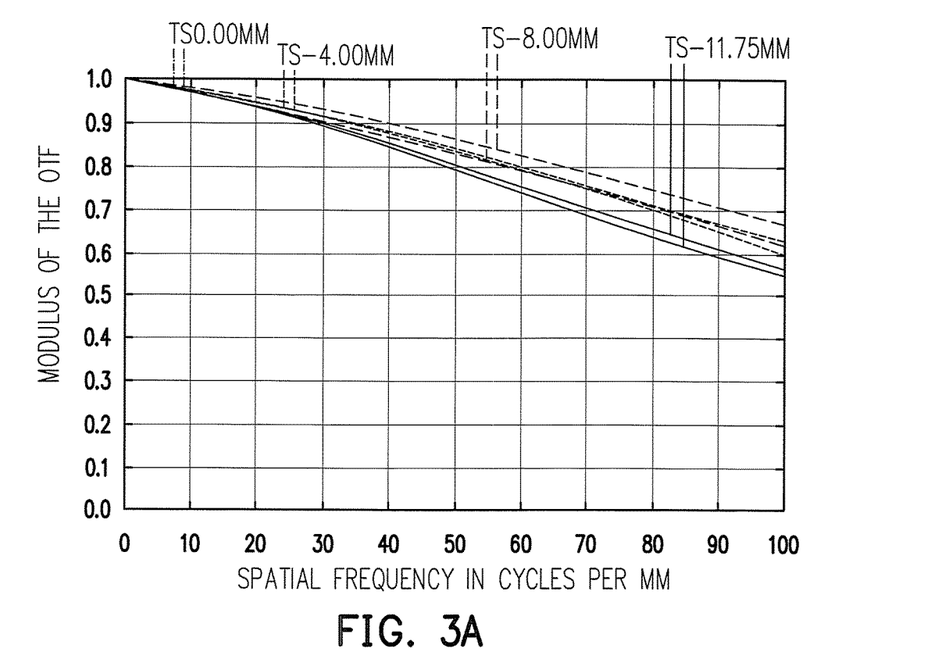
FIGS. 3A and 3B are MTF charts of the zoom lens at the wild angle end and the telephoto end respectively in the embodiment of the invention.
Figure 3B:
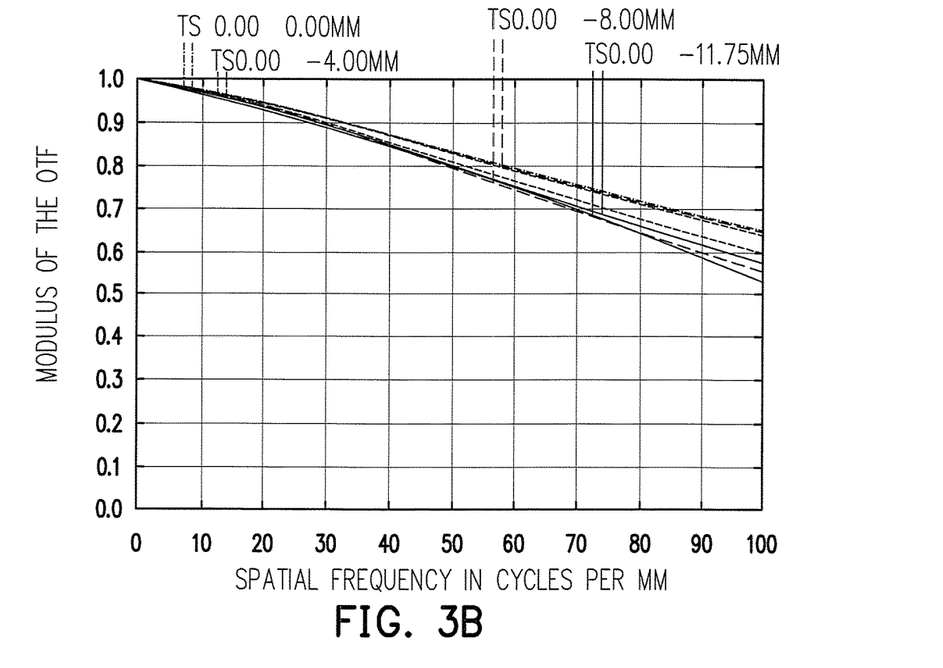
Figure 4A:
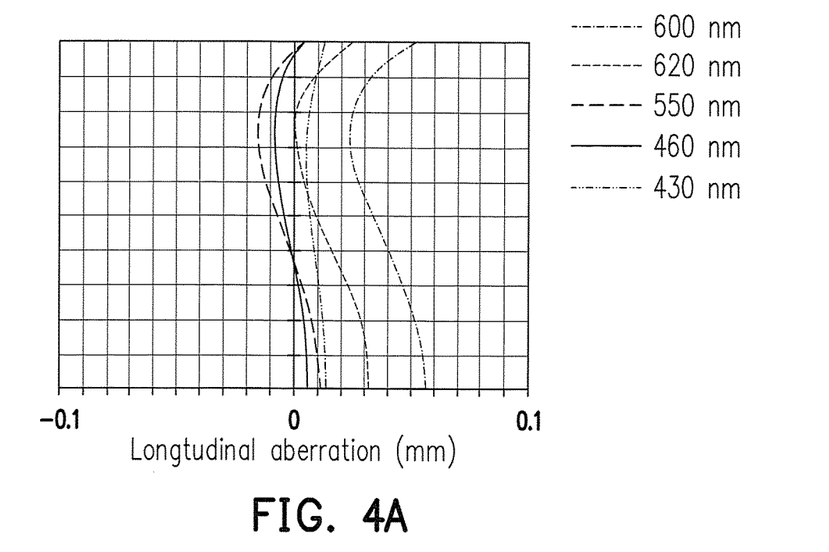
FIGS. 4A and 4B are longitudinal aberration charts of the zoom lens at the wild angle end and the telephoto end respectively of in embodiment of the invention.
Figure 4B:
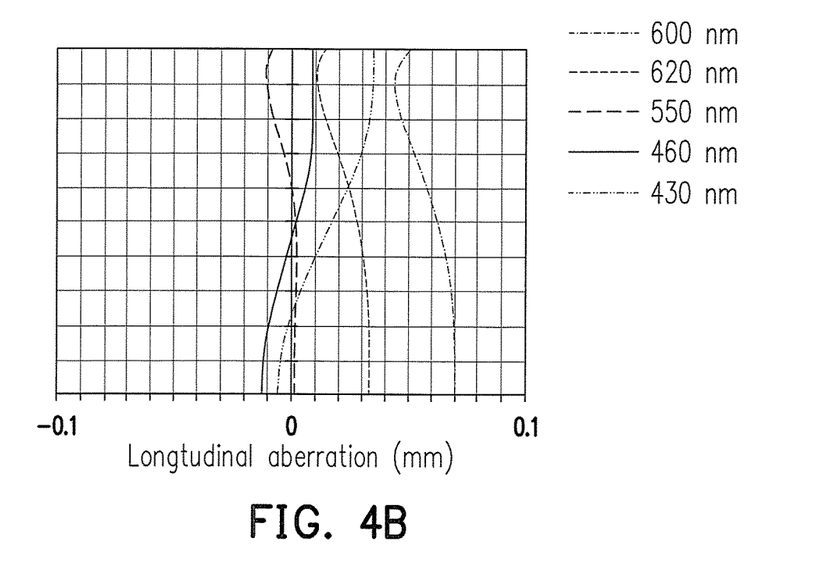
Figure 5A:
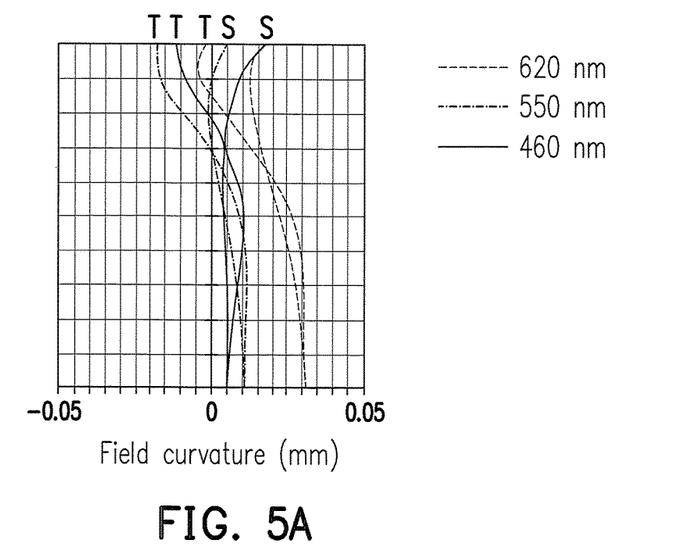
FIGS. 5A and 5B are field curvature charts of the zoom lens at the wild angle end and the telephoto end respectively in the embodiment of the invention.
Figure 5B:
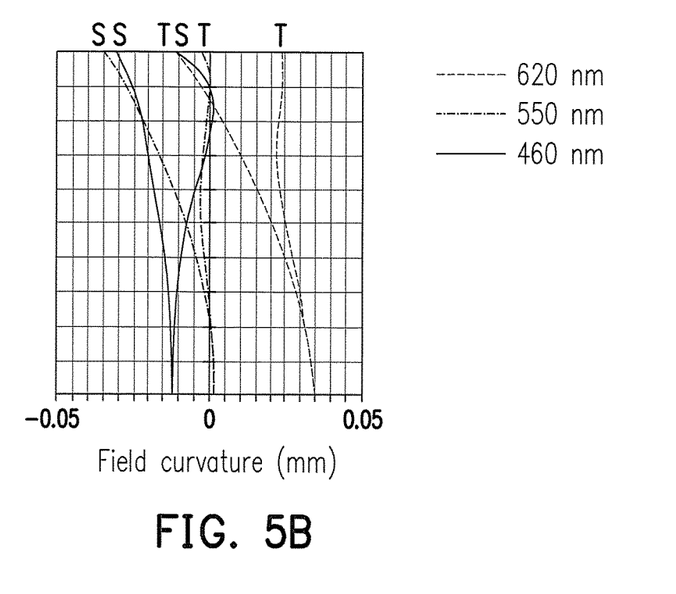
Figure 6A:
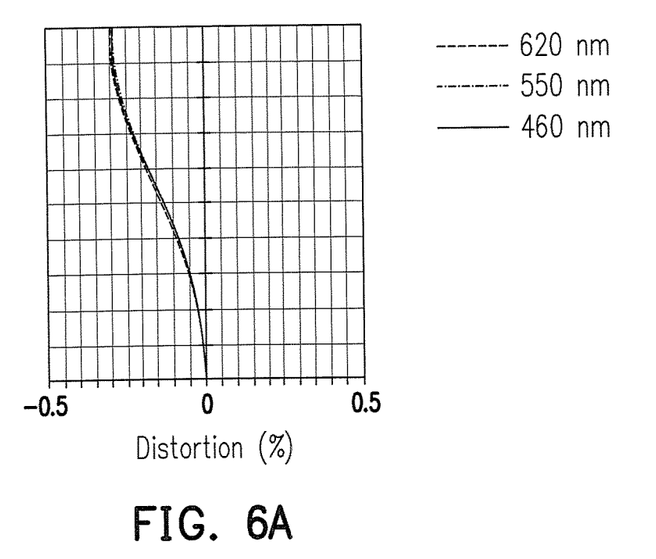
FIGS. 6A and 6B are distortion charts of the zoom lens at the wild angle end and the telephoto end respectively in the embodiment of the invention.
Figure 6B:
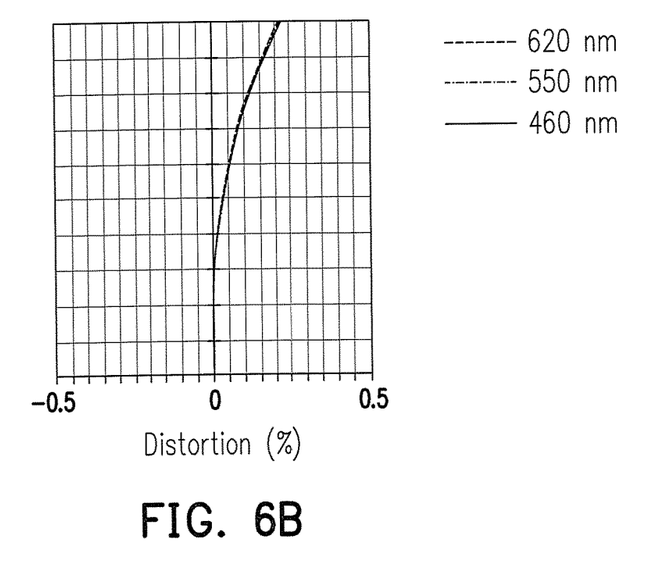
Figure 7A:
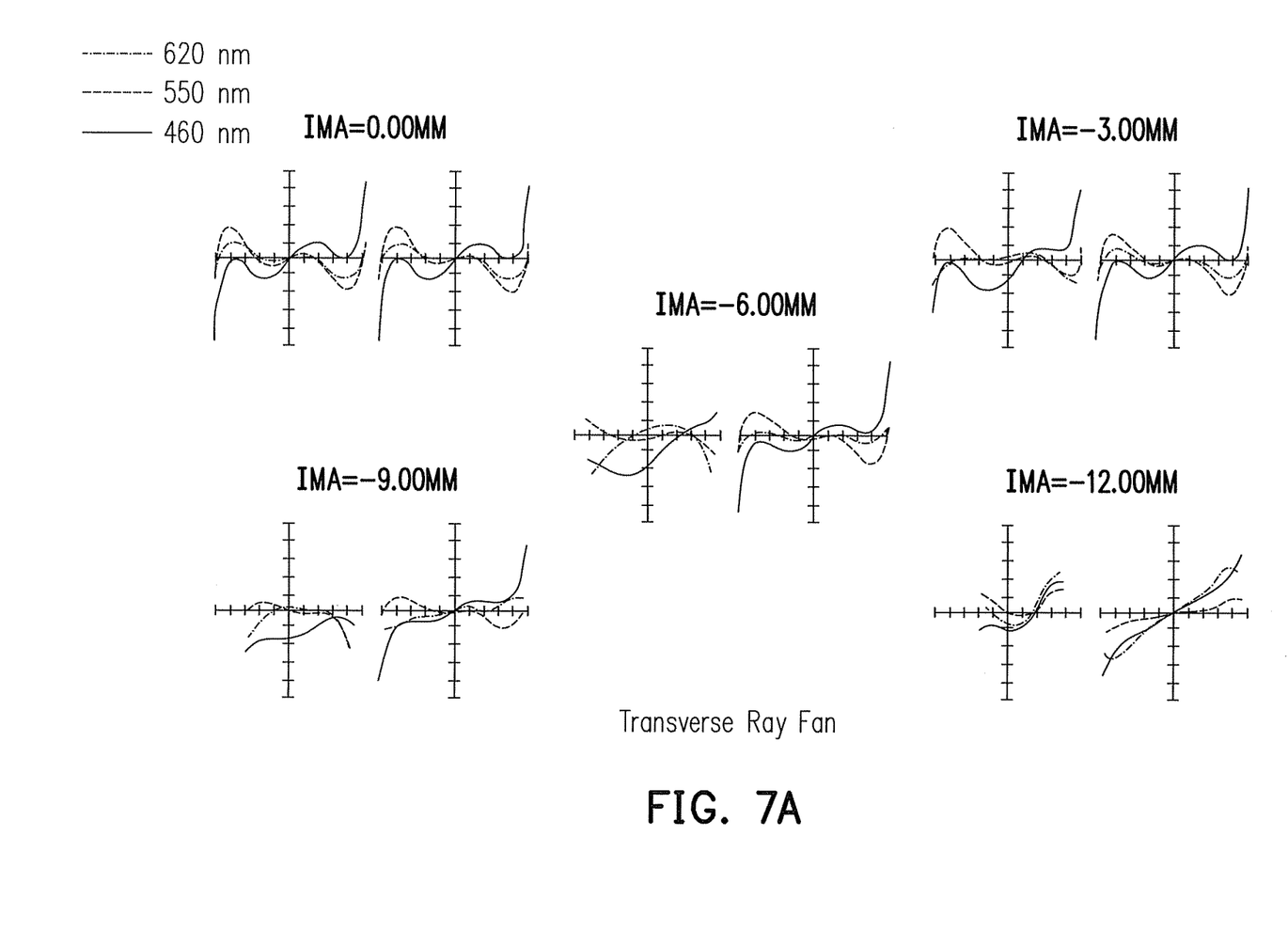
FIGS. 7A and 7B are ray fan plot charts of the zoom lens at the wild angle end and the telephoto end respectively in the embodiment of the invention.
Figure 7B:
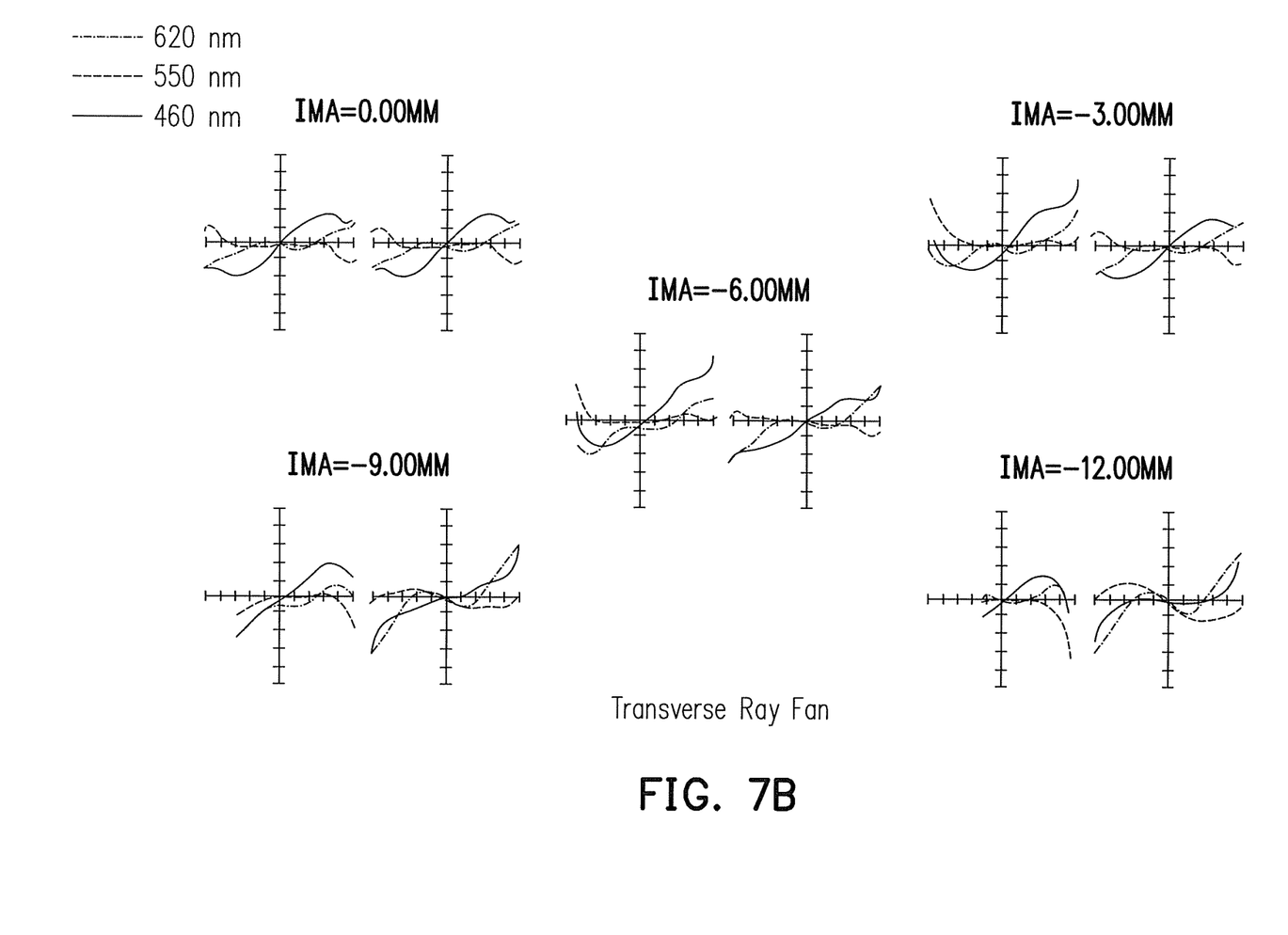

FIGS. 3A and 3B are MTF charts of the zoom lens at the wild angle end and the telephoto end respectively in the embodiment of the invention. FIGS. 4A and 4B are longitudinal aberration charts of the zoom lens at the wild angle end and the telephoto end respectively in embodiment of the invention. FIGS. 5A and 5B are field curvature charts of the zoom lens at the wild angle end and the telephoto end respectively in the embodiment of the invention. FIGS. 6A and 6B are distortion charts of the zoom lens at the wild angle end and the telephoto end respectively in the embodiment of the invention. FIGS. 7A and 7B are ray fan plot charts of the zoom lens at the wild angle end and the telephoto end respectively in the embodiment of the invention. The graphics as illustrated in FIG. 4A to FIG. 7A all falls within the standard range, thereby validating that the zoom lens 100 of the embodiment can indeed provide favorable optical quality. Also, f number of the zoom lens of the embodiment is, for example, 1.7, and the image resolution of the zoom lens is able to reach to 100 lp/mm.

In summary, the embodiments of the invention have at least one of the advantages below. In the embodiments of the invention, the zoom lens is formed by the first to the seventh lens units, and the seventh lens unit, which is closest to the image side, is remained fixed at the time of focusing and zooming, and the first lens unit is formed by a single lens. Therefore, during zooming, there is little variation in weight balance of the zoom lens 100 and the zoom lens can be prevent from tilting while attaching to a projection apparatus. In the embodiment of the invention, the zoom lens provides a zoom ratio of about 2×, and images projected from the zoom lens has high brightness and resolution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A zoom lens, comprising:
a first lens unit having a negative refractive power, wherein the first lens unit is formed by a single lens;
a second lens unit having a positive refractive power;
a third lens unit having a negative refractive power;
a fourth lens unit having a positive refractive power;
a fifth lens unit having a positive refractive power;
a sixth lens unit having a negative refractive power; and
a seventh lens unit having a positive refractive power, wherein the first lens unit, the second lens unit, the third lens unit, the fourth lens unit, the fifth lens unit, the sixth lens unit, and the seventh lens unit are arranged in order from an object side to an image side and are disposed along an optical axis of the zoom lens, a distance between the seventh lens unit and the image side is fixed, and the first lens unit, the second lens unit, the third lens unit, the fourth lens unit, the fifth lens unit and the sixth lens unit are adapted to move along the optical axis and the first lens unit and the second lens unit move in unison between the object side and the image side during zooming such that the distance between the first lens unit and the second lens unit is fixed at all times during zooming, the distance between the first lens unit and the second lens unit is variable during focusing, and the distance between all other adjacent lens units is variable during zooming.

2. The zoom lens according to claim 1, wherein the first lens unit comprises a first lens having a negative refractive power, the second lens unit comprises a second lens having a positive refractive power and a third lens having a positive refractive power arranged in order from the object side to the image side, the third lens unit comprises a fourth lens having a negative refractive power, a fifth lens having a negative refractive power and a sixth lens having a negative refractive power arranged in order from the object side to the image side, the fourth lens unit comprises a seventh lens having a negative refractive power and a eighth lens having a positive refractive power arranged in order from the object side to the image side, the fifth lens unit comprises a ninth lens having a positive refractive power, an aperture, a tenth lens having a positive refractive power and an eleventh lens having a negative refractive power arranged in order from the object side to the image side, the sixth lens unit comprises a twelfth lens having a negative refractive power, a thirteenth lens having a positive refractive power, a fourteenth lens having a negative refractive power, a fifteenth lens having a positive refractive power and a sixteenth lens having a positive refractive power in order from the object side to the image side, and the seventh lens unit comprises a seventeenth lens having a positive refractive power.

3. The zoom lens according to claim 2, wherein the first lens is a meniscus lens having a protruding surface facing the object side.

4. The zoom lens according to claim 2, wherein the second lens is a biconvex lens, and the third lens is a meniscus lens having a protruding surface facing the object side.

5. The zoom lens according to claim 2, wherein the fourth lens is a meniscus lens having a protruding surface facing the object side, and the fifth lens and the sixth lens are biconcave lenses.

6. The zoom lens according to claim 2, wherein the seventh lens is a biconcave lens, and the eighth lens is a biconvex lens.

7. The zoom lens according to claim 2, wherein the ninth lens is a plano-convex lens having a protruding surface facing the object side, the tenth lens is a biconvex lens, the eleventh lens is a negative meniscus lens having a protruding surface facing the image side, and the tenth lens and the eleventh lens form a cemented doublet lens.

8. The zoom lens according to claim 2, wherein the twelfth lens and the fourteenth lens are biconcave lenses, and the thirteenth lens, the fifteenth lens and the sixteenth lens are biconvex lenses, and the twelfth lens and the thirteenth lens form a cemented doublet lens.

9. The zoom lens according to claim 2, wherein the seventeenth lens is a meniscus lens having a protruding surface facing the object side.

10. The zoom lens according to claim 2, wherein the first lens, the second lens, the third lens, the fourth lens, the fifth lens, the sixth lens, the seventh lens, the eighth lens, the ninth lens, the tenth lens, the eleventh lens, the twelfth lens, the thirteenth lens, the fourteenth lens, the fifteenth lens, the sixteenth lens, the seventeenth lens are spherical lens.

11. The zoom lens according to claim 1, wherein $D_{object}$ is a distance along the optical axis between the object side and the first lens unit, $D_2$ is a distance along the optical axis between the first lens unit and the second lens unit, and the following condition formula is satisfied: $49.38 \leq D_{object}/D_2 \leq 3813.38$, wherein $D_2$ is ranged between 3.59~27.33 mm during focusing.

12. The zoom lens according to claim 1, wherein $D_{L2}$ is a distance along the optical axis between the image side and the second lens unit, $D_{L5}$ is a distance along the optical axis between the image side and the fifth lens unit, $D_{L6}$ is a distance along the optical axis between the image side and the sixth lens unit, and each of $D_{L2}$, $D_{L5}$ and $D_{L6}$ increases while an image height of the zoom lens is decreasing.

13. The zoom lens according to claim 12, wherein $D_2$ is a distance along the optical axis between the first lens unit and the second lens unit, and $D_2$ is fixed while the image height of the zoom lens changes.

14. The zoom lens according to claim 1, wherein $D_{L3}$ is a distance along the optical axis between the image side and the third lens unit, $D_{L4}$ is a distance along the optical axis between the image side and the fourth lens unit, and each of $D_{L3}$ and $D_{L4}$ decreases and then increases during a decrease of an image height of the zoom lens.

15. The zoom lens according to claim 14, wherein the third lens unit and the fourth lens unit each move in a locus direction that turn back in reverse directions at turning points, and $h_3$ is an image height of the zoom lens while the third lens unit is at its turning point during the decrease of the image height of the zoom lens, $h_4$ is an image height of the zoom lens while the fourth lens unit is at its turning point during the decrease of the image height of the zoom lens, and following condition formula is satisfied: $h_4 > h_3$.

16. The zoom lens according to claim 1, wherein $f_1$ is a focal length of the first lens unit, $f_w$ is a focal length of the zoom lens at a wide angle end, and following condition formula is satisfied:

$$\frac{f_1}{-13 < f_w < -5}.$$

17. The zoom lens according to claim 1, wherein $f_2$ is a focal length of the second lens unit, $f_w$ is a focal length of the zoom lens at an wide angle end, and following condition formula is satisfied:

$$1 < \frac{f_2}{f_w} < 7.$$

* * * * *